United States Patent
Jiang et al.

(10) Patent No.: US 8,243,030 B2
(45) Date of Patent: *Aug. 14, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 581 days.

This patent is subject to a terminal disclaimer.

(21) Appl. No.: 12/286,148

(22) Filed: Sep. 29, 2008

(65) Prior Publication Data

US 2009/0160796 A1 Jun. 25, 2009

(30) Foreign Application Priority Data

Dec. 21, 2007 (CN) .......................... 2007 1 0125408

(51) Int. Cl.
*G06F 3/041* (2006.01)
(52) U.S. Cl. ........ 345/173; 345/174; 313/582; 313/336; 428/338
(58) Field of Classification Search .......... 345/173–174; 445/24; 257/222; 349/12
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |
| 7,084,933 B2 * | 8/2006 | Oh et al. .......................... | 349/12 |

(Continued)

FOREIGN PATENT DOCUMENTS

CN 2539375 3/2003

(Continued)

OTHER PUBLICATIONS

Zhang et al., Science 306, 1358 (Nov. 2004).*

(Continued)

*Primary Examiner* — Peter Macchiarolo
*Assistant Examiner* — Mary Ellen Bowman
(74) *Attorney, Agent, or Firm* — Altis Law Group, Inc.

(57) ABSTRACT

A touch panel includes a first conductive layer, a second conductive layer and a capacitive sensing member. The first conductive layer includes a plurality of first conductive lines. The second conductive layer separated from the first conductive layer includes a plurality of second conductive lines. One of the plurality of conductive lines is located above the other plurality of conductive lines. The capacitive sensing member is connected to the first conductive lines. At least one of the first and second pluralities of conductive lines includes carbon nanotube wires. The carbon nanotube wires each include a plurality of carbon nanotubes. Further, a display device using the above-described touch panel is also included.

19 Claims, 7 Drawing Sheets

U.S. PATENT DOCUMENTS

| | | |
|---|---|---|
| 7,196,463 B2 | 3/2007 | Okai et al. |
| 7,215,329 B2 | 5/2007 | Yoshikawa et al. |
| 7,242,136 B2 | 7/2007 | Kim et al. |
| 7,336,261 B2 | 2/2008 | Yu |
| 7,348,966 B2 | 3/2008 | Hong et al. |
| 7,532,182 B2 | 5/2009 | Tseng et al. |
| 7,593,004 B2 | 9/2009 | Spath et al. |
| 7,630,040 B2 | 12/2009 | Liu et al. |
| 7,662,732 B2 | 2/2010 | Choi et al. |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 | 9/2010 | Irvin, Jr. et al. |
| 7,825,911 B2 | 11/2010 | Sano et al. |
| 7,854,992 B2 | 12/2010 | Fu et al. |
| 7,947,977 B2 | 5/2011 | Jiang et al. |
| 2002/0089492 A1 | 7/2002 | Ahn et al. |
| 2003/0122800 A1* | 7/2003 | Yu ................................ 345/173 |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kavase et al. |
| 2005/0209392 A1* | 9/2005 | Luo et al. ........................ 524/496 |
| 2006/0010996 A1* | 1/2006 | Jordan et al. .................. 73/866.1 |
| 2006/0022221 A1* | 2/2006 | Furukawa et al. ............. 257/222 |
| 2006/0044284 A1 | 3/2006 | Tanabe |
| 2006/0077147 A1 | 4/2006 | Palmateer et al. |
| 2006/0097991 A1* | 5/2006 | Hotelling et al. .............. 345/173 |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1* | 12/2006 | Spath et al. .................... 345/173 |
| 2006/0274049 A1 | 12/2006 | Spath et al. |
| 2006/0275956 A1 | 12/2006 | Konesky |
| 2006/0278444 A1* | 12/2006 | Binstead ...................... 178/18.06 |
| 2007/0065651 A1 | 3/2007 | Glatkowski et al. |
| 2007/0075619 A1* | 4/2007 | Jiang et al. ...................... 313/336 |
| 2007/0081681 A1 | 4/2007 | Yu et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1* | 11/2007 | Philipp ........................... 345/173 |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 | 12/2007 | Hata et al. |
| 2008/0029292 A1 | 2/2008 | Takayama et al. |
| 2008/0088219 A1 | 4/2008 | Yoon et al. |
| 2008/0129666 A1 | 6/2008 | Shimotono et al. |
| 2008/0138589 A1 | 6/2008 | Wakabayashi et al. |
| 2008/0192014 A1 | 8/2008 | Kent et al. |
| 2008/0238882 A1 | 10/2008 | Sivarajan et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1 | 1/2010 | Jiang et al. |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1 | 4/2010 | Jiang et al. |
| 2010/0171099 A1 | 7/2010 | Tombler, Jr. et al. |
| 2010/0271330 A1 | 10/2010 | Philipp |
| 2011/0032196 A1 | 2/2011 | Feng et al. |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |

| | | |
|---|---|---|
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | 200722559 | 6/2007 |
| TW | 200727163 | 7/2007 |
| TW | 284927 | 8/2007 |
| TW | 200729241 | 8/2007 |
| TW | 200737414 | 10/2007 |
| TW | 200738558 | 10/2007 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005073834 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003, 32(8)(lines from the 4th line to 35th line in the right column of p. 507 may be relevant).

Jiang Kai-Li, Li Qun-Qing, Fan Shou-Shan, "Continuous carbon nanotube yarns and their applications" Physics, vol. 32,8,p. 506-510,2003.

George Gruner, "Carbon Nanonets Spark New Electronics", Scientific American, pp. 76-83, May 2007.

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

Mei Zhang etal., "Strong Transparent, Multifunctional, Carbon Nanotube Sheets", Science, America, AAAS, vol. 309, pp. 1215-1219, Aug. 19, 2005.

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

Yu Xiang, Technique of Touch Panel & the Production of Resistance-type Touch Panel Insulation Dot, Journal of Longyan Teachers College, p. 25-26, vol. 22, No. 6, 2004.

Wu et al."Transparent, Conductive Carbon Nanotube Films". Science,vol. 305,(2004);pp. 1273-1276.

ASM Handbook."vol. 2 Properties and Selection: Nonferrous Alloys and Special-Purpose Materials".Apr. 2007; pp. 840-853.

Fan et al. "Self-Oriented Regular Arrays of Carbon Nanotubes and Their Field Emission Properties". Science, vol. 283, (1999); pp. 512-514.

Susuki et al. "Investigation of physical and electric properties of silver pastes as binder for thermoelectric materials". Review of Scientific Instruments,76,(2005);pp. 023907-1 to 023907-5.

* cited by examiner

TOUCH PANEL AND DISPLAY DEVICE USING THE SAME

RELATED APPLICATIONS

This application is related to commonly-assigned applications entitled, "TOUCH PANEL", filed Sep. 29, 2008, Ser. No. 12/286,266; "TOUCH PANEL", filed Sep. 29, 2008, Ser. No. 12/286,141; "TOUCH PANEL AND DISPLAY DEVICE USING THE SAME", filed Sep. 29, 2008, Ser. No. 12/286,154; "TOUCH PANEL AND DISPLAY DEVICE USING THE SAME", filed Sep. 29, 2008, Ser. No. 12/286, 189; "TOUCH PANEL AND DISPLAY DEVICE USING THE SAME", filed. Sep. 29, 2008, Ser. No. 12/286,176; "ELECTRONIC ELEMENT HAVING CARBON NANOTUBES", filed Sep. 29, 2008, Ser. No. 12/286,143; "TOUCH PANEL AND DISPLAY DEVICE USING THE SAME", filed Sep. 29, 2008, Ser. No. 12/286,166; "TOUCH PANEL AND DISPLAY DEVICE USING THE SAME", Sep. 29, 2008, Ser. No. 12/286,181; "TOUCH PANEL AND DISPLAY DEVICE USING THE SAME", filed Sep. 29, 2008, Ser. No. 12/286,148; "TOUCHABLE CONTROL DEVICE", filed Sep. 29, 2008, Ser. No. 12/286,140; "TOUCH PANEL AND DISPLAY DEVICE USING THE SAME", filed Sep. 29, 2008, Ser. No. 12/286,146; "TOUCH PANEL AND DISPLAY DEVICE USING THE SAME", filed Sep. 29, 2008, Ser. No. 12/286,216; "TOUCH PANEL AND DISPLAY DEVICE USING THE SAME", filed Sep. 29, 2008, Ser. No. 12/286,152; "TOUCH PANEL AND DISPLAY DEVICE USING THE SAME", filed Sep. 29, 2008, Ser. No. 12/286,145; "TOUCH PANEL, METHOD FOR MAKING THE SAME, AND DISPLAY DEVICE ADOPTING THE SAME", filed Sep. 29, 2008, Ser. No. 12/286,155; "TOUCH PANEL AND DISPLAY DEVICE USING THE SAME", filed Sep. 29, 2008, Ser. No. 12/286,179; "TOUCH PANEL, METHOD FOR MAKING THE SAME, AND DISPLAY DEVICE ADOPTING THE SAME", filed Sep. 29, 2008, Ser. No. 12/286,288; "TOUCH PANEL AND DISPLAY DEVICE USING THE SAME", filed Sep. 29, 2008, Ser. No. 12/286,153; "TOUCH PANEL AND DISPLAY DEVICE USING THE SAME", filed Sep. 29, 2008, Ser. No. 12/286,184; "METHOD FOR MAKING TOUCH PANEL", filed Sep. 29, 2008, Ser. No. 12/286,175; "METHOD FOR MAKING TOUCH PANEL", filed Sep. 29, 2008, Ser. No. 12/286,195; "TOUCH PANEL AND DISPLAY DEVICE USING THE SAME", filed Sep. 29, 2008, Ser. No. 12/286, 160; "TOUCH PANEL AND DISPLAY DEVICE USING THE SAME", filed Sep. 29, 2008, Ser. No. 12/286,220; "TOUCH PANEL AND DISPLAY DEVICE USING THE SAME", filed Sep. 29, 2008, Ser. No. 12/286,227; "TOUCH PANEL AND DISPLAY DEVICE USING THE SAME", filed Sep. 29, 2008, Ser. No. 12/286,144; "TOUCH PANEL AND DISPLAY DEVICE USING THE SAME", filed Sep. 29, 2008, Ser. No. 12/286,218; "TOUCH PANEL AND DISPLAY DEVICE USING THE SAME", filed Sep. 29, 2008, Ser. No. 12/286,142; "TOUCH PANEL AND DISPLAY DEVICE USING THE SAME", filed Sep. 29, 2008, Ser. No. 12/286,541; "TOUCH PANEL, METHOD FOR MAKING THE SAME, AND DISPLAY DEVICE ADOPTING THE SAME", filed Sep. 29, 2008, Ser. No. 12/286,151; and "TOUCH PANEL, METHOD FOR MAKING THE SAME, AND DISPLAY DEVICE ADOPTING THE SAME", filed Sep. 29, 2008, Ser. No. 12/286,219. The disclosures of the above-identified applications are incorporated herein by reference.

BACKGROUND

1. Field of the Invention

The present invention relates to touch panels and, particularly, to a carbon nanotube based touch panel and a display device using the same.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, stylus, or another like tool while visually observing the display device through the touch panel. Therefore, a demand exists for touch panels that provide superior visibility and reliable operation.

Up to the present time, different types of touch panels, including resistance, capacitance, infrared, and surface sound-wave types have been developed. The capacitance-type touch panel has advantages such as high accuracy and excellent transparency, thus has been widely used.

There are two types of conventional capacitance-type touch panels: single-point capacitance-type touch panel, and multipoint capacitance-type touch panel. The multipoint capacitance-type touch panel includes a driving layer and a sensing layer. The driving layer includes a plurality of driving lines parallel to each other. The sensing layer includes a plurality of sensing lines parallel to each other. The multipoint capacitance-type touch panel further includes a insulating layer disposed between the sensing layer and the driving layer. The sensing lines and the driving lines are arranged in different planes, and the orientation of the sensing lines is perpendicular to the orientation of the driving lines. Where projections of the sensing lines intersect with the driving lines form a plurality of capacitive sensing nodes. The sensing nodes represent different coordinates on the touch panel. The driving layer is connected to a driving circuit. The driving circuit separately and alternately drives a current through each of the driving lines while all the other lines are grounded. The sensing layer is connected to a capacitive sensing circuit. The capacitive sensing circuit continuously senses the capacitance of each of the sensing lines.

In operation, an upper surface of the touch panel is pressed/touched with one or several touch tools, such as an electrical pen or user's fingers. And visual observation of a screen on the liquid crystal display device provided on a backside of the touch panel is provided. In use, due to an electrical field of the user, coupling capacitances between the user's fingers and the sensing nodes disturb coupling capacitances between the first conductive lines and the second conductive lines. Thus, the touch tool takes away currents from the touch points. Currents flowing through the capacitive sensing circuit cooperatively replace the currents lost at the sensing nodes. The positions of the touch points can be simultaneously identified by an integrated circuit of the capacitive sensing circuit.

The material of the insulating layer is glass. The material of the driving lines and the sensing lines is selected from a group consisting of indium tin oxide (ITO) and antimony tin oxide (ATO). Additionally, a filling layer is formed in gaps between the adjacent lines. The material of the filling layer has similar refractive index as the material of the lines. As such, the touch panel with the filling layer can provide a uniform transparency.

The sensing lines and the driving lines (e.g., ITO lines) are generally formed by means of ion-beam sputtering, and this method is relatively complicated. Furthermore, the ITO lines have generally poor mechanical durability, low chemical endurance, and uneven resistance over an entire area of the touch panel. Additionally, the ITO layers have relatively low transparency. All the above-mentioned problems of the ITO layers tend to yield a touch panel with somewhat low sensitivity, accuracy, and brightness.

What is needed, therefore, is to provide a touch panel and a display device using the same having good durability, high sensitivity, accuracy, and brightness.

SUMMARY

In one embodiment, a touch panel includes a first conductive layer, a second conductive layer and a capacitive sensing member. The first conductive layer includes a plurality of first conductive lines. The second conductive layer separated from the first conductive layer includes a plurality of second conductive lines. One of the plurality of conductive lines is located above and spatially intersecting with the other plurality of conductive lines. The capacitive sensing member is connected to the first conductive lines. At least one of the first and second pluralities of conductive lines includes carbon nanotube wires. The carbon nanotube wires each include a plurality of carbon nanotubes. Further, a display device using the above-described touch panel is also included.

Other advantages and novel features of the present touch panel and display device using the same will become more apparent from the following detailed description of exemplary embodiments, when taken in conjunction with the accompanying drawings.

BRIEF DESCRIPTION OF THE DRAWINGS

Many aspects of the present touch panel and display device using the same can be better understood with reference to the following drawings. The components in the drawings are not necessarily to scale, the emphasis instead being placed upon clearly illustrating the principles of the present touch panel and display device using the same.

Figure 1:
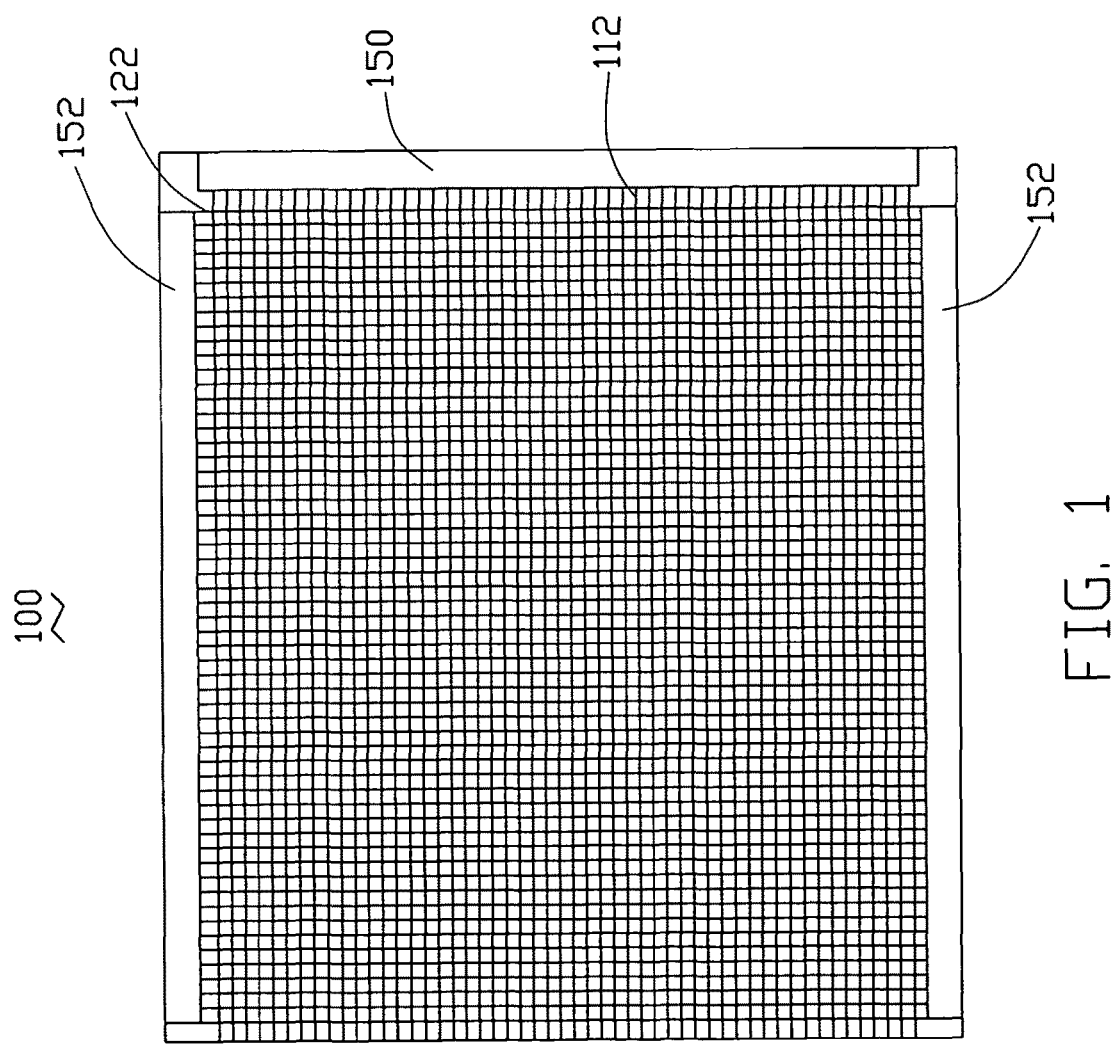
FIG. 1 is a top view of a partially assembled touch panel, in accordance with a present embodiment.

Corresponding reference characters indicate corresponding parts throughout the several views. The exemplifications set out herein illustrate at least one embodiment of the present touch panel and display device using the same, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present touch panel and display device using the same.

Figure 2:
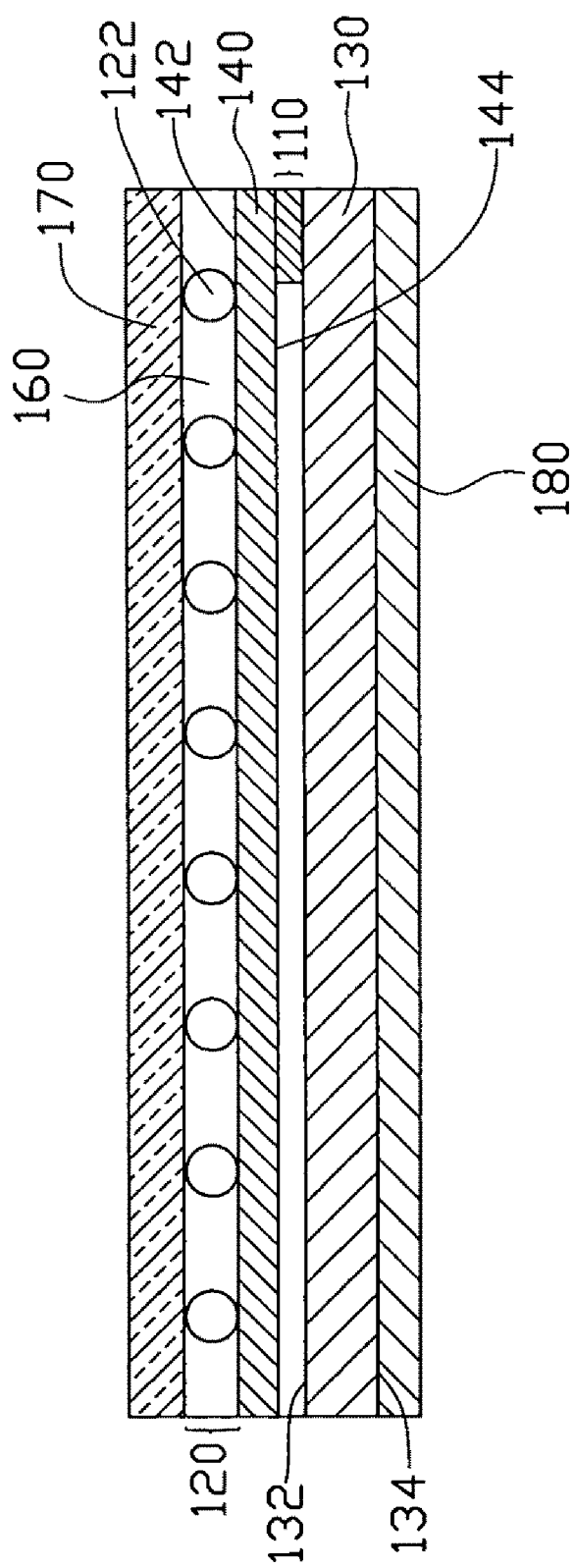
FIG. 2 is a cross-sectional schematic view of the touch panel of FIG. 1.

Referring to FIG. 1 and FIG. 2, a touch panel 100 includes a first conductive layer 110, a second conductive layer 120 spaced apart from and opposite to the first conductive layer 110, and a capacitive sensing member 150. The first conductive layer 110 includes a plurality of first conductive lines 112. The second conductive layer 120 includes a plurality of second conductive lines 122. The first conductive lines 112 and the second conductive lines 122 are disposed in two separate planes and where the second conductive lines 122 pass over the first conductive lines 112 they are considered to be spatially intersecting with each other. The plurality of first conductive lines 112 are connected to the capacitive sensing member 150.

The touch panel 100 can further includes a first substrate 130 and a second substrate 140. The first substrate 130 is disposed opposite to the second substrate 140. The first substrate 130 includes a first surface 132 and a second surface 134. The second substrate 140 includes a third surface 142 and a fourth surface 144. The first surface 132 faces the fourth surface 144. The first conductive layer 110 is disposed between the first surface 132 and the fourth surface 144. The second conductive layer 120 is disposed on the third surface 142. The touch panel 100 can further includes a protective layer 170 covered the second conductive layer 120.

The first substrate 130 and the second substrate 140 are transparent plates and can be made of rigid material such as glass, quartz, diamond, or flexible material such as polymer, or resin. When it is desired that the first substrate 130 and the second substrate 140 be flexible, the material thereof can be selected from a group consisting of polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, and acrylic resins. A thickness of the first substrate 130 and the second substrate 140 can be in the approximate range from 0.05 millimeters to 1 centimeter. In the present embodiment, the first substrate 130 and the second substrate 140 are made of glass. The thickness of the first substrate 130 is about 1 to 5 millimeters. The thickness of the second substrate 140 is about 0.3 to 0.5 millimeters. Understandably, the first substrate 130 and the second substrate 140 are used to support the first conductive layer 110 and the second conductive layer 120. Thus, the material of the first substrate 130 and the second substrate 140 should not be restricted to the above-mentioned materials but any other suitable transparent materials. It is to be understood that the second substrate 140 is optional and configured for separating the first conductive layer 110 and the second conductive layer 120. In other embodiments, the touch panel 100 can include a framework spaced apart from the first conductive layer 110, the second substrate 140 omitted, and the plurality of second conductive lines 122 supported by the framework.

It is to be noted that the shape of the first substrate 130 is the same as the second substrate 140 and is chosen according to the requirements of the touch field (i.e., sensing area) of the touch panel 100. A shape of the sensing area of the touch panel 100 can be arbitrarily set (e.g. a rectangular area, or a triangular area). In the present embodiment, the shapes of the touch field and the substrate 110 are rectangular.

The first conductive lines 112 and the second conductive lines 122 are spaced apart, and as such, electrically insulated from each other. The distribution of the first conductive lines 112 and the second conductive lines 122 can be set in any desirable patterns. In this case, the position of the first conductive lines 112 and the second conductive lines 122 depends on the coordinate system used. For example, the first conductive lines 112 and the second conductive lines 122 can be placed in rows and columns for Cartesian coordinates, or concentrically and radially for polar coordinates. When using rows and columns, the rows and columns may be placed at various angles relative to one another. In a suitable embodiment, the first conductive lines 112 and the second conductive lines 122 can be vertical, horizontal, or diagonal. The spatial intersections of the first conductive lines 112 and the second conductive lines 122 form a plurality of capacitive sensing nodes. The sensing nodes represent different coordinates on the touch panel 100. In the present embodiment, the first conductive lines 112 are disposed along a first direction and parallel to one another. The second conductive lines 122 are disposed along a second direction and parallel to one another. An angle α formed between the first direction and the second direction is in an approximate range from 0° to 90°. In this embodiment, the angle α is equal to 90° (i.e., the first direction is perpendicular to the second direction).

The number of the first conductive lines 112 and the second conductive lines 122, and distances between two adjacent first conductive lines 112 or two adjacent second conductive lines 122 are dependent on a desired resolution of the touch panel 100. The number of the first conductive lines 112 and the second conductive lines 122 can be identical or different. In the present embodiment, the distance between two adjacent first conductive lines 112 and two adjacent second conductive lines 122 is anywhere from 1 micron to 5 millimeters.

It is to be understood that the positioning of the first conductive lines 112 and the second conductive lines 122 is not limited to the above-mentioned configurations. The only need is to insure spatial intersections of the first conductive lines 112 and the second conductive lines 122 to form a plurality of capacitive sensing nodes. In other embodiments, the first conductive lines 112 and the second conductive lines 122 can be arranged in irregular curves rather than straight lines. It is to be understood that the positioning of the first conductive lines 112 and the second conductive lines 122 is related to the shape of the sensing area of the touch panel 100.

At least one line of the first conductive lines 112 and the second conductive lines 122 is a carbon nanotube wire or a plurality of carbon nanotube wires joined or twisted together. In the present embodiment, all the first conductive lines 112 and the second conductive lines 122 are carbon nanotube wires.

Figure 3:
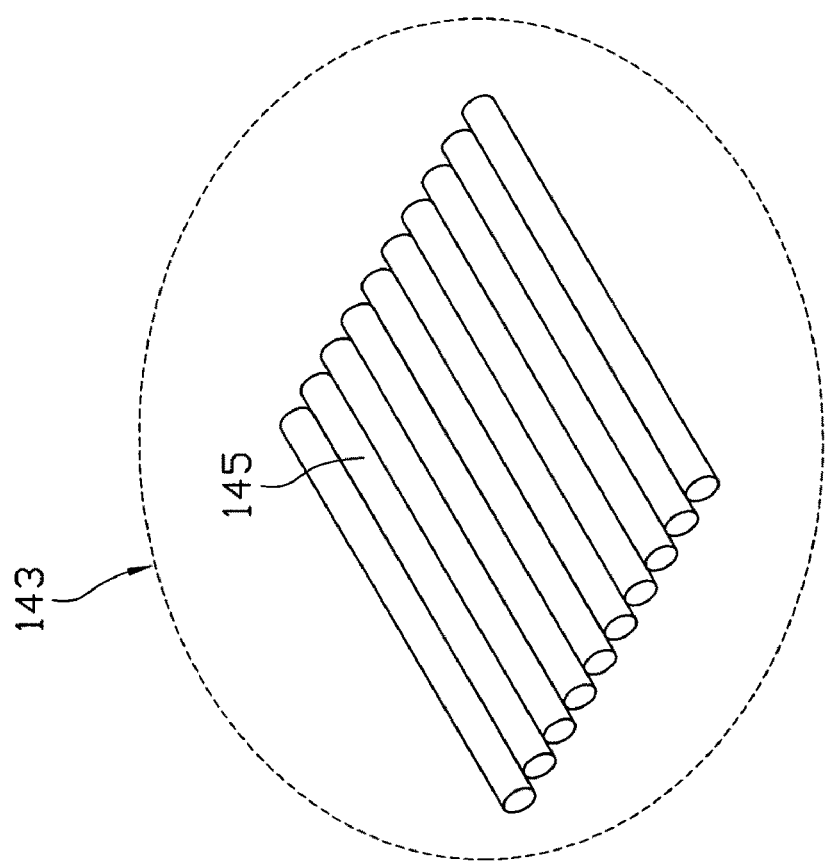
FIG. 3 is a structural schematic of a carbon nanotube segment.

Referring to FIG. 3, each carbon nanotube wire comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape.

Figure 4:
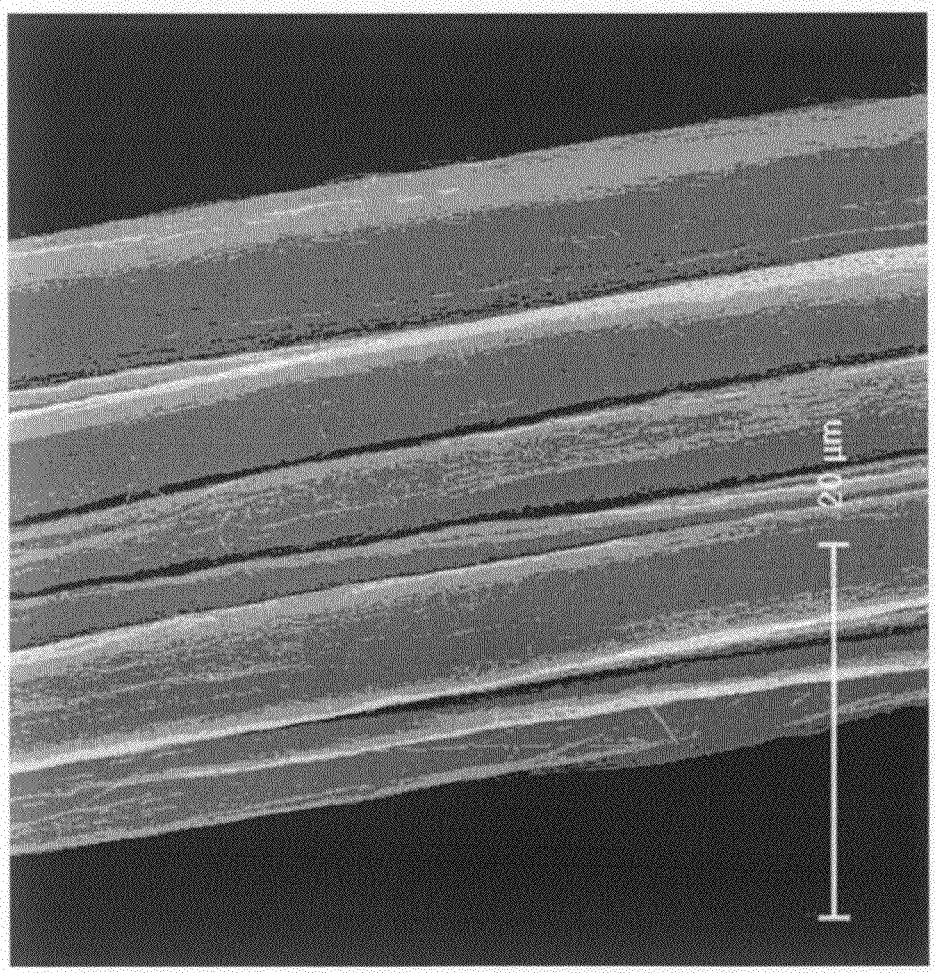
FIG. 4 shows a Scanning Electron Microscope (SEM) image of an untwisted carbon nanotube wire used in the touch panel of FIG. 1.
Figure 5:
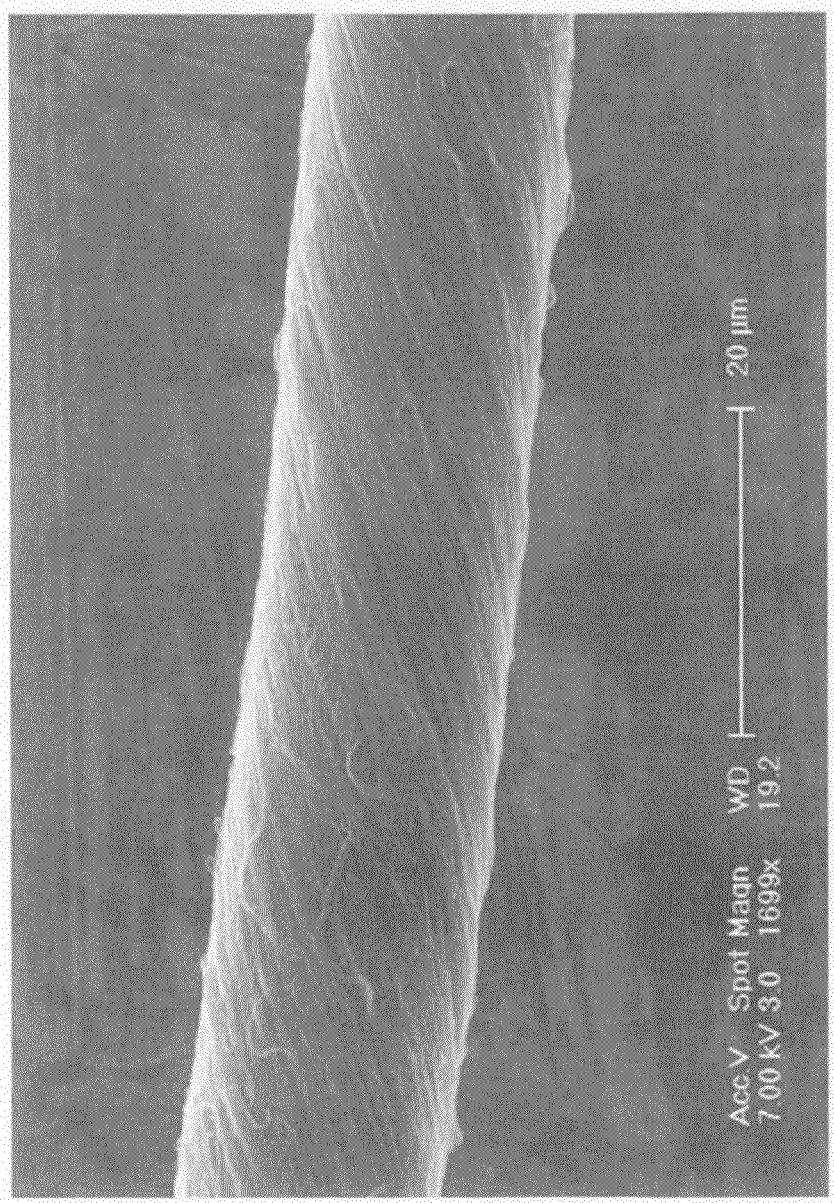
FIG. 5 shows a Scanning Electron Microscope (SEM) image of a twisted carbon nanotube wire used in the touch panel of FIG. 1.

The carbon nanotube wire used can be twisted or untwisted. Referring to FIG. 4, the untwisted carbon nanotube wire includes a plurality of carbon nanotubes oriented along a same direction (i.e., a direction along the length of the line). Referring to FIG. 5, the twisted carbon nanotube wire includes a plurality of carbon nanotubes oriented around an axial direction of the first conductive line 112 or the second conductive line 122. More specifically, the carbon nanotube wire includes a plurality of successive carbon nanotubes joined end to end by van der Waals attractive force therebetween. Length of the carbon nanotube wire can be arbitrarily set as desired. A diameter of the carbon nanotube wire is in an approximate range from 0.5 nanometers to 100 micrometers (μm). The carbon nanotubes in the carbon nanotube wires can be selected from a group consisting of single-walled, double-walled, and multi-walled carbon nanotubes. A diameter of each single-walled carbon nanotube is in an approximate range from 0.5 nanometers to 50 nanometers. A diameter of each double-walled carbon nanotube is in an approximate range from 1 nanometer to 50 nanometers. A diameter of each multi-walled carbon nanotube is in an approximate range from 1.5 nanometers to 50 nanometers.

It is to be understood that the carbon nanotube wire provides superior toughness, high mechanical strength, and is easy to bend. As such, the first conductive lines 112 and the second conductive lines 122 formed with the carbon nanotube wires can be used with flexible substrates to form a flexible touch panel.

A method for fabricating the above-described carbon nanotube wire includes the steps of: (a) providing an array of carbon nanotubes, specifically and quite suitably, a super-aligned array of carbon nanotubes; (b) pulling out a carbon nanotube structure (film or yarn) from the array of carbon nanotubes, by using a tool (e.g., adhesive tape, pliers, tweezers, or another tool allowing multiple carbon nanotubes to be gripped and pulled simultaneously); and (c) treating the carbon nanotube structure with an mechanical force to form a carbon nanotube wire.

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can, beneficially, be a P-type silicon wafer, an N-type silicon wafer, or a silicon wafer with a film of silicon dioxide thereon. Preferably, a 4-inch P-type silicon wafer is used as the substrate.

In step (a2), the catalyst can, advantageously, be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height of about 50 microns to 5 millimeters and include a plurality of carbon nanotubes parallel to each other and approximately perpendicular to the substrate. The carbon nanotubes in the array can be multi-walled carbon nanotubes, double-walled carbon nanotubes, or single-walled carbon nanotubes. Diameters of the multi-walled carbon nanotubes are in the approximate range from 1.5 nanometers to 50 nanometers. Diameters of the double-walled carbon nanotubes are in the approximate range from 1 nanometer to 50 nanometers. Diameters of the single-walled carbon nanotubes are in the approximate range from 0.5 nanometers to 10 nanometers.

The super-aligned array of carbon nanotubes formed under the above conditions is essentially free of impurities such as carbonaceous or residual catalyst particles. The carbon nanotubes in the super-aligned array are closely packed together by van der Waals attractive force.

In step (b), the carbon nanotube structure can be formed by the substeps of: (b1) selecting a plurality of carbon nanotube segments having a predetermined width from the super-aligned array of carbon nanotubes; and (b2) pulling the carbon nanotube segments at an even/uniform speed to achieve a uniform carbon nanotube structure.

In step (b1), quite usefully, the carbon nanotube segments having a predetermined width can be selected by using an adhesive tape as the tool to contact the super-aligned array. Each carbon nanotube segment includes a plurality of carbon nanotubes parallel to each other. In step (b2), the pulling direction is, usefully, substantially perpendicular to the growing direction of the super-aligned array of carbon nanotubes.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube structure (i.e., carbon nanotube film or carbon nanotube yarn) having a predetermined width can be formed. When the tool has a relatively wide end, a large amount of carbon nanotube segments can be gripped and pulled from the carbon nanotube array. As such, the carbon nanotube film can be formed. When the tool has a relatively narrow end, a small amount of carbon nanotube segments can be gripped and pulled from the carbon nanotube array. As such, the carbon nanotube yarn can be formed. The carbon nanotube structure includes a plurality of carbon nanotubes joined ends to ends. The carbon nanotubes in the carbon nanotube structure are all substantially parallel to the pulling/drawing direction thereof. The carbon nanotube structure formed by the pulling/drawing method has superior uniformity of thickness. Further, the pulling/drawing method is simple, fast, and suitable for industrial applications.

The width of the carbon nanotube structure depends on a size of the tool. The length of the carbon nanotube structure can be arbitrarily set, as desired. When the substrate is a 4-inch P-type silicon wafer as in the present embodiment, the width of the carbon nanotube structure is in an approximate range from 0.01 centimeter to 10 centimeters. When the width of the carbon nanotube structure is relatively small, the carbon nanotube structure is a carbon nanotube yarn. When the width of the carbon nanotube structure is relatively large, the carbon nanotube structure is a carbon nanotube film. The carbon nanotubes in the carbon nanotube structure can include single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in an approximate range from 0.5 to 50 nanometers, 1 to 50 nanometers, and 1.5 to 50 nanometers.

In step (c), the carbon nanotube structure can be treated with mechanical force (e.g., a conventional spinning process), to acquire a carbon nanotube wire in a twisted shape. It is to be understood that when the width of the carbon nanotube structure is relatively small (i.e., when the carbon nanotube structure is carbon nanotube yarn), step (c) can be omissible to acquire a carbon nanotube wire in an untwisted shape. In this situation, through microscopically view, the carbon nanotube structure is a flat film, and through macroscopically view, the carbon nanotube structure is a long wire.

It is noted that because the carbon nanotubes in the super-aligned carbon nanotube array have a high purity and a high specific surface area, the carbon nanotube wires are adherent in nature. As such, the carbon nanotube wires can be directly adhered to the third surface 142 and the fourth surface 144 of the second substrate 140 to be used as the first conductive lines 112 and the second conductive lines 122.

Once the carbon nanotube wires are adhered to the third surface 142 and the fourth surface 144 of the second substrate 140, the carbon nanotube wires can be treated with an organic solvent. Specifically, the carbon nanotube wires can be treated by dropping the organic solvent from a dropper onto the carbon nanotube wires to soak the entire surface of the carbon nanotube wires. The organic solvent is volatilizable and can, suitably, be selected from a group consisting of ethanol, methanol, acetone, dichloroethane, chloroform, and any appropriate mixture thereof. In the present embodiment, the organic solvent is ethanol. After being soaked by the organic solvent, the carbon nanotube segments in each of the treated carbon nanotube wires will bundle up as much as possible, and the treated carbon nanotube wires will better adhere to the third surface 142 and the fourth surface 144 of the second substrate 140 due, in part at least, to the surface tension created by the organic solvent. Due to the decrease of the specific surface area via bundling, the coefficient of friction of the treated carbon nanotube wires is reduced, the mechanical strength is increased and toughness is maintained when compared untreated carbon nanotube structure.

Unlike previous methods for making an ITO lines, the present method does not require a vacuum environment and heat processing, due to the carbon nanotube wires being obtained by being pulled out from an array of carbon nanotubes. Thus, the carbon nanotube wires used as the first conductive lines 112 and the second conductive lines 122 have the advantage of being low cost, environmentally safe, and energy efficient.

The first conductive lines 112 are connected to the capacitive sensing member 150. The capacitive sensing member 150 continuously senses all of the capacitance changes on the first conductive lines 112. The second conductive lines 122 are connected to a driving circuit 152 (not shown). In the present embodiment, the driving circuit is disposed on an edge or corner of the touch panel 100 and connected to the second conductive lines 122. It is to be understood, the second conductive lines 122 can be connected to the driving circuit 152 through outer conductive wires. In this condition, the driving circuit 152 can be set outside the touch panel 100. The driving circuit 152 separately and alternately drives the current through each of the second conductive lines 122. When one second conductive line 122 is driven, all the other second conductive lines 122 are grounded. In this way, the driving circuit 152 alternately scans the second conductive lines 122. A plurality of coupling capacitances are formed by the spatial intersections of the first conductive lines 112 and the second conductive lines 122. In use, when an upper surface of the touch panel is pressed/touched with one or several touch tools, such as an electrical pen or user's fingers, the coupling capacitances are changed. Due to the quick scan of the driving circuit, the capacitive changes on the first conductive lines 112 can be readily detected.

The capacitive sensing member 150 typically includes one or more integrated chips (ICs) used as sensors. The ICs measure the capacitance on the first conductive lines 112 and record the positions of the first conductive lines 112 with capacitive changes. The capacitive sensing member 150 is disposed on an edge or corner of the touch panel 100 and connected to the first conductive lines 112. In the present embodiment, the capacitive sensing member 150 is disposed on one side of the first surface 132 of the first substrate 130. It is to be understood, the first conductive lines 112 can be connected to the capacitive sensing member 150 through outer conductive wires. In this condition, the capacitive sensing member 150 can be set outside the touch panel 100.

The capacitive sensing member 150 and the driving circuit 152 can be connected together by an outer conductive wire (not shown). The driving circuit 152 reports the position of the second conductive line 122 currently being scanned to the capacitive sensing member 150. As such, the capacitive sensing member 150 can get the positions of both the first conductive lines 112 and the second conductive lines 122. And accordingly, the capacitive sensing member 150 can get the coordinates of the position with capacitive changes.

The gaps between the adjacent first and second conductive lines 112, 122 do not have the same optical index as the first and second conductive lines 112, 122. As such, a filling layer 160 can be further provided and formed in the gaps between the first and second conductive lines 112, 122, to improve the visual appearance of the touch panel 100. The filling layer 160 is formed of an insulative material with similar optical index as the first and second conductive lines 112, 122.

Additionally, in order to prolong operational life span and restrict coupling capacitances of the touch panel 100, a transparent protective layer 170 can be disposed on the second conductive layer 120. The transparent protective layer 170 can receive a surface hardening treatment to protect the second conductive layer 120 from being scratched when in use. The transparent protective layer 170 can be adhered to the second conductive layer 120 or combined with the second conductive layer 120 by a hot-pressing method. The material of the transparent protective layer 170 can be selected from a group consisting of silicon nitride, silicon dioxide, BCB, polyesters, acrylic resins, PET, and any combination thereof.

In the present embodiment, the material of the transparent protective layer 170 is PET. The hardness and thickness of the transparent protective layer 170 are selected according to practical needs. The transparent protective layer 170 is adhered to the second conductive layer 120.

The touch panel 100 can further include a shielding layer 180 disposed on the second surface 134 of the first substrate 130. The material of the shielding layer 180 can be ITO film, ATO film, conductive resin film, carbon nanotube film, or other conductive film. In the present embodiment, the shielding layer 180 is a carbon nanotube film. The carbon nanotube film includes a plurality of carbon nanotubes, and the orientation of the carbon nanotubes therein can be arbitrarily determined. In the present embodiment the carbon nanotubes in the carbon nanotube film of the shielding layer are arranged along a same direction. The carbon nanotube film is connected to ground and acts as shielding and, thus, enabling the touch panel 100 to operate without interference (e.g., electromagnetic interference).

Figure 6:
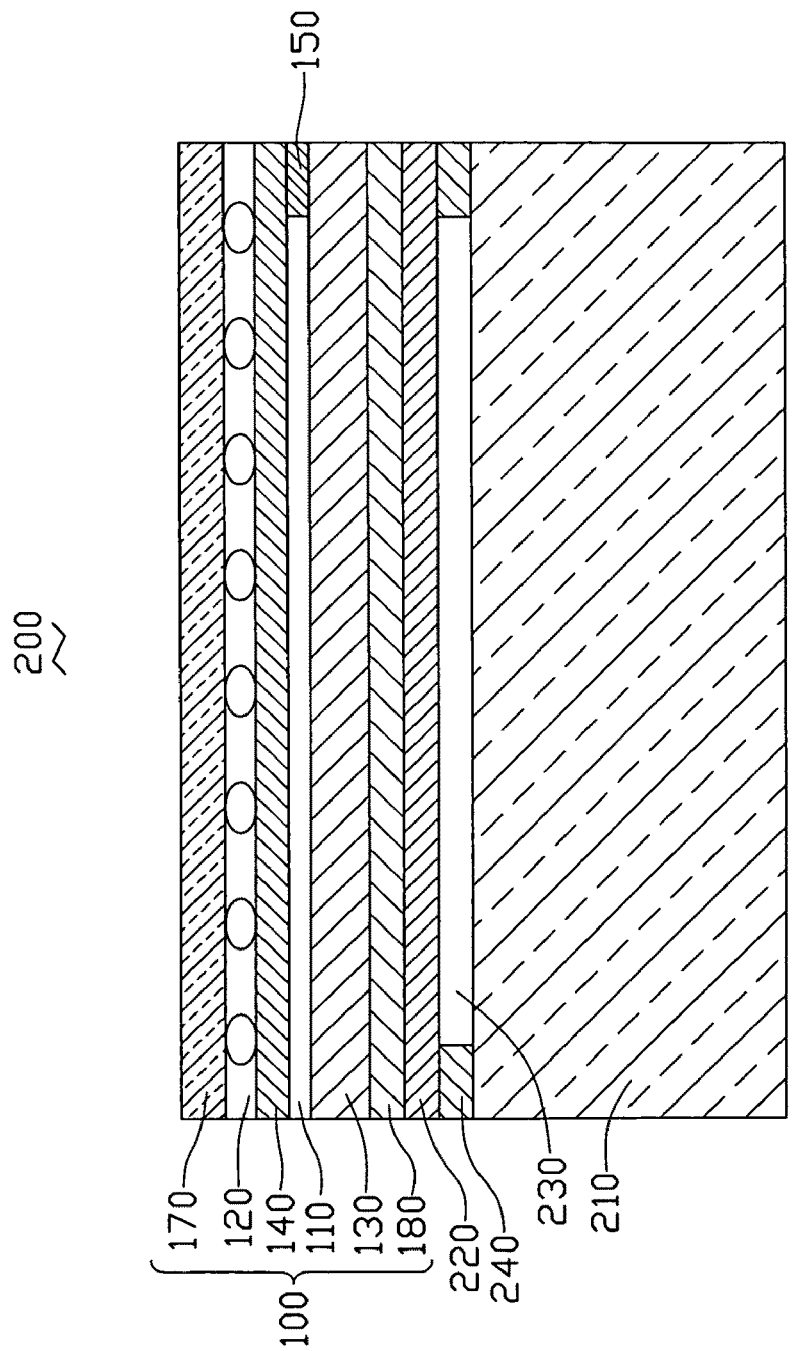
FIG. 6 is a schematic assembled cross-sectional view of the touch panel of the present embodiment used with a display element of a display device.
Figure 7:
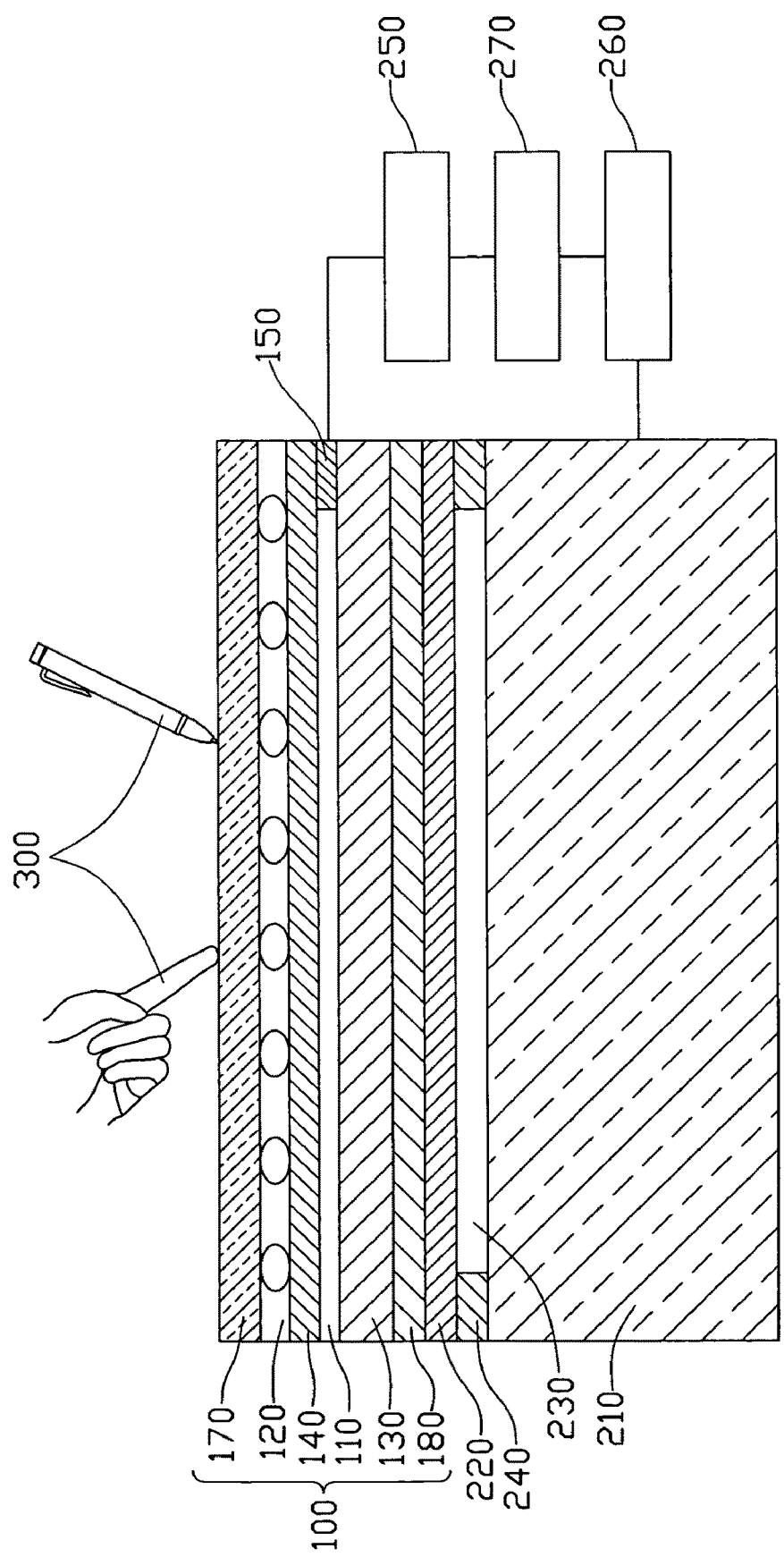
FIG. 7 is similar to FIG. 6, but also showing other components of the display device, and showing the touch panel in use.

Referring to FIG. 6, FIG. 7, and FIG. 2, a display device 200 includes the touch panel 100, a display element 210, a touch panel controller 250, a central processing unit (CPU) 270, and a display element controller 260. The second surface 134 of the first substrate 130 of the touch panel 100 is opposite and adjacent to the display element 210. The touch panel 100 can be spaced from the display element 210 or installed on the display element 210. The touch panel 100 is connected to the touch panel controller 250 by an external circuit. The touch panel controller 250, the CPU 270 and the display element controller 260 are electrically connected. The CPU 270 is connected to the display element controller 260 to control the display element 210.

The display element 210 can be, e.g., a conventional display such as a liquid crystal display, field emission display, plasma display, electroluminescent display, vacuum fluorescent display, cathode ray tube, or another display device, or a flexible display such as an e-paper (i.e., a microencapsulated electrophoretic display), a flexible liquid crystal display, a flexible organic light emitting display (OLED), or any other flexible display.

When the shielding layer 180 is disposed on the second surface 134 of the first substrate 130, a passivation layer 220 is disposed on a surface of the shielding layer 180 that faces away from the first substrate 130. The material of the passivation layer 220 can, opportunely, be selected from a group consisting of silicon nitride, silicon dioxide, benzocyclobutenes, polyesters, acrylic resins, polyethylene terephthalate, and any combination thereof. The passivation layer 220 can be spaced from the display element 210 or can be directly installed on the display element 210. When the passivation layer 220 is spaced at a distance from the display element 210, two or more spacers 240 can be used. Thereby, a gap 230 is provided between the passivation layer 220 and the display element 210. The passivation layer 220 protect the shielding layer 180 from chemical damage (e.g., humidity of the surrounding) or mechanical damage (e.g., scratching during fabrication of the touch panel).

In operation, an upper surface of the touch panel 100 is pressed/touched with one or several touch tools 300, such as an electrical pen or user's fingers. The capacitive sensing member 150 reports the capacitive changes and the position coordinates according to the capacitive sensing nodes having the capacitive changes to the touch panel controller 250. The touch panel controller 250 converts the analog capacitive changes and the position coordinates to digital data. The CPU receives the digital data and sends commands to display element controller 260 to control the display element 210 accordingly. More specifically, capacitances exist at the sensing nodes. When a user touches a node, due to an electrical field of the user, the touch tools 300 take away little currents from the touch points. That is, the coupling capacitance between the touch tool 300 and the transparent conductive layer 120 disturbs the capacitance at the sensing nodes. Currents flowing through the capacitive sensing member 150 cooperatively replace the currents lost at the touch points. The position coordinates of the touch points can be simultaneously identified by the integrated circuit of the capacitive sensing member 150.

The carbon nanotube wires provided in the present embodiment has superior properties, such as excellent toughness and high mechanical. Thus, the touch panel 100 and the display device 200 using the same are durable and highly reliable. Accordingly, the flexible touch panel can be formed and used in a flexible display device. Further, the pulling method for fabricating each carbon nanotube wires is simple, and the adhesive carbon nanotube wire can be disposed on the substrate directly. As such, the method for fabricating the carbon nanotube wires is suitable for the mass production of touch panels and display devices using the same and reduces the costs thereof. Furthermore, the carbon nanotube wires have a high transparency, thereby promoting improved brightness of the touch panel and the display devices using the same. Additionally, since the carbon nanotubes have excellent electrical conductivity properties, the carbon nanotube wires formed by a plurality of carbon nanotubes have a uniform resistance distribution. Thus the touch panel and the display device adopting the carbon nanotube wires have improved sensitivity and accuracy.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A touch panel comprising:
a first conductive layer comprising a plurality of first conductive lines spaced from each other;
a second conductive layer separated from the first conductive layer and comprising a plurality of second conductive lines spaced from each other;
a capacitive sensing member being directly connected to the first conductive lines; and
at least one of the first and second conductive lines are carbon nanotube wires, and each carbon nanotube wire comprising a plurality of successively oriented carbon nanotube segments joined end-to-end by van der Waals attractive force therebetween, each of the plurality of successively oriented carbon nanotube segment comprising a plurality of carbon nanotubes parallel to each other and combined by van der Waals attractive force therebetween;
wherein the plurality of second conductive lines is located above the plurality of first conductive lines forming a plurality of capacitive sensing nodes.

2. The touch panel as claimed in claim 1, wherein the first conductive lines are parallel to each other and aligned along a first direction, the second conductive lines are parallel to each other and aligned along a second direction.

3. The touch panel as claimed in claim 2, wherein an angle $\alpha$, is defined between the first direction and the second direction, the angle $\alpha$ is in an approximate range from 0° to 90°.

4. The touch panel as claimed in claim 1, wherein a diameter of each carbon nanotube wire is in an approximate range from 0.5 nanometers to 100 microns.

5. The touch panel as claimed in claim 1, wherein the carbon nanotube wire is twisted.

6. The touch panel as claimed in claim 1, wherein the carbon nanotube wire is untwisted, and the carbon nanotubes in the untwisted carbon nanotube wire are oriented along a same direction.

7. The touch panel as claimed in claim 1, wherein the carbon nanotubes in the carbon nanotube wire are selected from a group consisting of single-walled carbon nanotubes, double-walled carbon nanotubes, multi-walled carbon nanotubes, and any combination thereof, diameters of the single-walled, double-walled, and multi-walled carbon nanotubes are respectively in an approximate range from 0.5 nanometers to 50 nanometers, 1 nanometer to 50 nanometers, and 1.5 nanometers to 50 nanometers.

8. The touch panel as claimed in claim 1, further comprising a first substrate and a second substrate adjacent to the first substrate, the first conductive layer being disposed on a first surface of the first substrate, the second substrate being disposed on the first conductive layer, and the second conductive layer being disposed on the second substrate.

9. The touch panel as claimed in claim 8, wherein the first substrate and the second substrate are made of a material selected from the group consisting of glass, quartz, diamond, polymer, and resin.

10. The touch panel as claimed in claim 1, further comprising a filling layer, the filling layer located in a space by the first conductive lines and the second conductive lines.

11. The touch panel as claimed in claim 10, wherein the filling layer is formed of a material with similar optical index as the first conductive lines and the second conductive lines.

12. The touch panel as claimed in claim 1, further comprising a transparent protective layer disposed on a surface of the second conductive layer, and the material of the transparent protective layer being selected from the group consisting of silicon nitride, silicon dioxide, benzocyclobutenes, polyesters, acrylic resins, polyethylene terephthalate, and any combination thereof.

13. The touch panel as claimed in claim 1, further comprising a shielding layer disposed on the first substrate, and the material of the shielding layer being selected from the group consisting of indium tin oxide film, antimony tin oxide film, conductive resin films, carbon nanotube films, and any combination thereof.

14. The touch panel as claimed in claim 13, wherein the carbon nanotube film comprises a plurality of carbon nanotubes aligned along a same direction.

15. A display device comprising:
a touch panel comprising
a first conductive layer,
a second conductive layer, and
a capacitive sensing member,
the first conductive layer comprising a plurality of first conductive lines spaced from each other, the second conductive layer separated from the first conductive layer and comprising a plurality of second conductive lines spaced from each other, the first conductive lines are carbon nanotube wires, each carbon nanotube wire comprising a plurality of successively oriented carbon nanotube segments joined end-to-end by van der Waals attractive force therebetween, each of the plurality of successively oriented carbon nanotube segment comprising a plurality of carbon nanotubes parallel to each other and combined by van der Waals attractive force therebetween, and the capacitive sensing member being directly connected to the first conductive lines; and
a display element opposite and adjacent to the touch panel;
wherein the plurality of second conductive lines is located above the plurality of first conductive lines forming a plurality of capacitive sensing nodes.

16. The display device as claimed in claim 15, further comprising a first controller configured for controlling the touch panel, a central processing unit, and a second controller configured for controlling the display element; the first controller, the central processing unit and the second controller being electrically connected with each other; the display element being connected to the second controller, and the touch panel being connected to the first controller.

17. The display device as claimed in claim 15, wherein the display element is selected from the group consisting of liquid crystal displays, field emission displays, plasma displays, electroluminescent displays, vacuum fluorescent displays, cathode ray tubes, e-papers, flexible liquid crystal displays, and flexible organic light emitting displays.

18. The display device as claimed in claim 15, further comprising a passivation layer disposed between the touch panel and the display element, and the material of the passivation layer being selected from a group consisting of silicon nitride, silicon dioxide, plastic, and resin.

19. A touch panel comprising:
a first substrate comprising a first surface and a second surface opposite to the first surface;
a first conductive layer disposed on a first surface of the first substrate, and the first conductive layer comprises a plurality of first conductive lines spaced from each other;
a second substrate disposed on the first conductive layer;
a second conductive layer separated from the first conductive layer and disposed on the second substrate, and the second conductive layer comprises a plurality of second conductive lines spaced from each other;
a shielding layer located directly on the second surface of the first substrate, the shielding layer comprising a carbon nanotube film, the carbon nanotube film comprises a plurality of carbon nanotubes joined end to end by van der Waals attractive force therebetween, and a majority of the plurality of carbon nanotubes of the carbon nanotube film are aligned along a same direction;
a capacitive sensing member being directly connected to the first conductive lines;
wherein the first conductive lines are carbon nanotube wires, and each carbon nanotube wire comprising a plurality of successively oriented carbon nanotube segments joined end-to-end by van der Waals attractive force therebetween, each of the plurality of successively oriented carbon nanotube segments comprises a plurality of carbon nanotubes that are parallel to each other and combined by van der Waals attractive force therebetween; and the plurality of second conductive lines is located above the plurality of first conductive lines forming a plurality of capacitive sensing nodes.

* * * * *